United States Patent

Hagen

[15] 3,648,060

[45] Mar. 7, 1972

[54] TRANSISTORIZED CURRENT SWITCH FOR MEMORY SYSTEMS

[72] Inventor: Thomas E. Hagen, Saugerties, N.Y.

[73] Assignee: Ferroxcube Corporation, Saugerties, N.Y.

[22] Filed: Aug. 21, 1970

[21] Appl. No.: 66,016

[52] U.S. Cl. ..............................307/215, 307/254, 307/270, 307/315

[51] Int. Cl. ..................................H03k 17/00, H03k 19/36

[58] Field of Search..................307/215, 254, 270, 296, 315

[56] References Cited

UNITED STATES PATENTS 3,515,899 6/1970 May.......................................307/215

*Primary Examiner*—John Zazworsky
*Attorney*—Frank R. Trifari

[57] ABSTRACT

A transistorized current-switching device energizable by means of two logic inputs coupled to first and second stage transistors which are in turn coupled to a three-stage direct-coupled transistor switch provided with diode interstage coupling.

4 Claims, 2 Drawing Figures

INVENTOR.
THOMAS E. HAGEN

BY

AGENT

TRANSISTORIZED CURRENT SWITCH FOR MEMORY SYSTEMS

This invention relates to transistorized switching devices and more specifically to a relatively high current transistorized switching device.

Current switches with logic selection find utility in memory systems wherein current pulses are selectively derived for employment along drive lines coupled to suitable memory elements. In large memory arrays, high-current sources are desirable. Since margin tolerances must be kept relatively narrow, low noise is a prime requirement of such systems, along with high speed.

Disadvantages of prior art circuits lie in their inability to switch relatively high currents with high-voltage source supplies under conditions employing minimum noise and relatively high switching times.

It is therefore the prime object of this invention to provide a transistor circuit for switching relatively high currents under relatively low-noise conditions utilizing high-voltage source supplies.

It is a further object of this invention to provide a transistorized circuit for accomplishing the foregoing object which is easily integratable.

The foregoing aspects of the invention are realized with the provisions of a device employing a first stage of transistors connected in a logic configuration, such as the NAND-gate configuration, in turn coupled to a transistor switch supplying the operating potential to a three-stage transistor network, each stage of which is directly coupled to the next successive stage. Noise is minimized in the three stage transistor network switch by means of a mutually opposed diode pair clamping the base of the first stage to the source of operating potential, and inverse breakdown inhibited by means of diodes interconnecting each emitter-base junction of the three stage transistor network.

Figure 1:
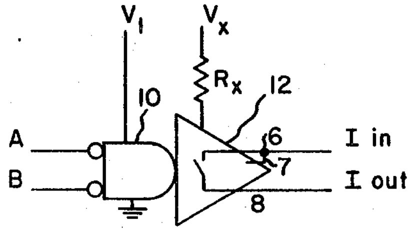
Figure 2:
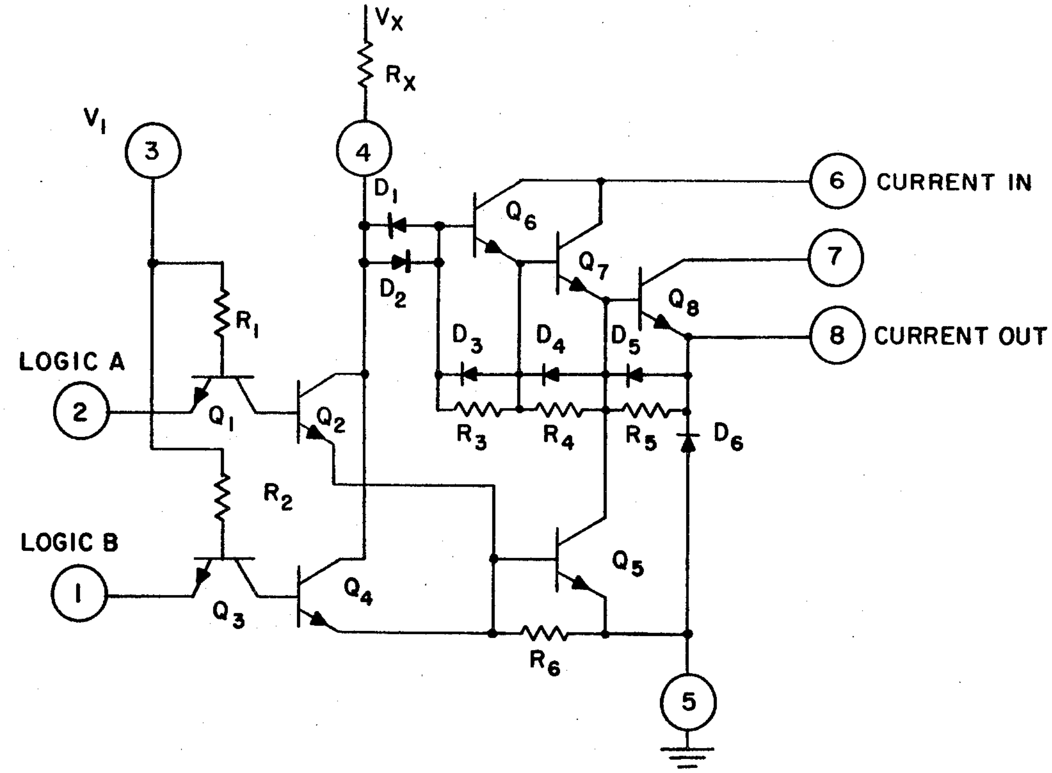

The foregoing brief description of the invention and objects stated will become more apparent from the following detailed description of the invention with reference to the accompanying drawings wherein FIG. 1 represents block diagram of the operation of the invention, and FIG. 2 is a circuit diagram of the invention.

Referring to FIG. 1 the device operates with the use of a logic network 10 having inputs A and B. Schematically illustrated as coupled to logic circuit 10 is a current switch 12 which couples the input current source line to the current output source line upon proper energization of the logic circuit 10. Logic circuit 10 is energized by voltage source V1, and switch 12 is energized by voltage $Vx$ through resistance $Rx$. In operation, logic circuit 10 will close the switch in the unit 12 in response to a low (binary 0) input on inputs A and B. The presence of a high input (binary 1) on either or both of the inputs A and B will result in the switch being in the open position. Thus, the Boolean function for the switch 10 is $S=\overline{A}\cdot\overline{B}$.

An example of a circuit for accomplishing the forgoing function is illustrated in FIG. 2. The logic inputs appear at terminals 1 and 2 and are respectively coupled to the transistors Q1 and Q3. The voltage V1 at terminal 3 is coupled to the transistors Q1 and Q3 respectively through the base resistances R1 and R2. The output of the transistor Q1 is coupled to the base of the transistor Q2, and the output of the transistor Q3 coupled to the base of transistor Q4. A voltage source $Vx$ is coupled through resistance $Rx$ to terminal 4 and to the collectors of the transistors Q2 and Q4. The output of the transistor Q2 and Q4 are each coupled to the base of the transistor Q5 which in turn is coupled through resistance R6 to the emitter of transistor Q5 and then to terminal 5 which is in turn connected to a suitable reference point such as a ground.

The output of the transistor Q5 is coupled to a three stage transistor network consisting of transistors Q6, Q7 and Q8 each directly coupled to the next by means of emitter-base connections. The transistor Q6 has its collector connected to the collector of transistor Q7. The base-emitter junctions of the transistor stages Q6, Q7 and Q8 are interconnected by means of oppositely poled diodes D3, D4 and D5 which are in turn shunted by resistance R3, R4, and R5. The collector of transistor Q5 is connected to the terminal between the resistances R4 and R5 and a diode D6 clamps the emitter of transistor Q8 to the reference potential at terminal 5. The common collector connection of transistors Q6 and Q7 form one line terminal 6, the collector of transistor Q8 a common line terminal 7, and the emitter of transistor Q8 the other line terminal 8. A pair of oppositely poled diodes D1 and D2 connect the base of transistor Q6 to the terminal 4.

In operation, logic signals A and B are applied to the emitters of transistors Q1 and Q3. If either or both logic signals are high, the transistor Q1 and/or Q3 will be nonconductive causing a high potential to be applied to the base of either transistor 2 or Q4 resulting in either of those transistors rendered conductive. The rendering of either Q2 or Q4 conductive will result in Q5 also conducting, thereby having the effect of placing effectively ground potential at the point adjoining R4 and R5, the emitter of transistor Q7 and base of transistor Q8. The ground potential at the base of transistor Q8 will result in transistor Q8 being rendered nonconductive thereby preventing a complete circuit from being formed between the terminals 6 or 7 and the terminal 8. When both logic inputs A and B are in their low (binary 0) state, both transistors Q1 and Q3 are rendered conductive, and transistors Q2, Q4, and Q5 are cut off. Thus, a relatively high potential is placed at the junction of the base of transistor Q6 through diode D1 and D2. The same high potential exists through the emitter of transistor Q6 and base of transistor Q7 and at the base of transistor Q8 through the emitter of transistor Q7. As a result, the current switch is closed and current can now flow from terminals 6 and 7 to terminal 8 through an external load. The use of the opposite poled diodes D1 and D2 between the base of transistor Q6 and the supply line from $Vx$ has the effect of improving output noise threshold by raising the potential required to turn on transistor Q6. Diodes D3, D4 and D6 also help prevent any inverse breakdown which may occur due to inductive kickback caused by switching of the transistors Q6, Q7 and Q8. The transistor Q5 also aids in removal of base charge on transistor Q8 to assist in high turnoff speed, and the resistances R3, R4 and R5 provide proper biasing for the transistors Q6, Q7 and Q8.

By way of example, the following values are given. Each of the transistors may be the same type, Motorola MPS2369, except for transistor Q8 which is a 2N3724-type, resistances R1 and R2 are 1500 Ohms, and resistances R3, R4, R5 and R6 180 Ohms. The resistances $Rx$ may be equal to 120 Ohms when $Vx$ equals 4.5 volts, and may equal 2000 Ohms when $Vx$ equals 40 volts.

It will be apparent that other variations may be employed within the scope of the invention, particularly the polarity of the various devices signal levels may be altered, as may be the values given above as exemplary. Accordingly, the forgoing description is to be construed as illustrative only and that many modifications and variations may be made therein without departing from the spirit or scope of the invention.

With the foregoing components, the parameters of the circuit are approximately as follows: the inventive arrangement can switch a current of 0.9 ampere, have a turn on delay of 50 nanoseconds, measured from the 10 percent point of the last input to go "low" to the 90 percent point of the switch output current. A logic input fall time (toward "low") of 10 nanoseconds will result in a turn on time of 30 nanoseconds. Turn off delay is 50 nanoseconds measured from the 90 percent point of the first input to go "high" to the 10 percent point of the switch output current. A logic input rise time (toward "high") of 10 nanoseconds shall result in a turnoff time of 30 nanoseconds.

Other variations and modifications are clearly encompassed within the inventive scope and although certain embodiments and descriptions have been provided, it is to be understood that various further modifications, omissions and refinements which depart from the disclosed exemplary embodiments may be adopted without departing from the spirit or scope of the invention.

What is claimed is:

1. A transistorized current switch comprising a logic first stage for providing a plurality of logic inputs, a current switching second stage connected to said first stage and including first, second the third transistors each having base, emitter and collector electrodes, the emitter electrode of said first transistor coupled to the base electrode of said second transistor and the emitter electrode of said second transistor connected to the base electrode of said third transistor, first, second and third oppositely poled diodes interconnecting the emitter base junctions of each of said transistors, a pair of oppositely poled diodes connecting the base electrode of the first transistor of said three transistors stages to a source of potential, said second stage responsive to a predetermined logic input condition of said first stage for forming a closed circuit allowing current flow through said collector electrodes of said first and second transistors of said second stage to the emitter electrode of the third transistor of said three transistor stage.

2. The combination of claim 1 further including a shunt resistance for each of said first, second and third diodes. of the current switching stage.

3. The combination of claim 1 further including a further transistor coupled to each of the transistors of said second stage, said further transistor including an emitter electrode connected to a reference point, a base electrode connected to the output of said logic stage, and a collector electrode connected to the base electrode of said third transistor.

4. The combination of claim 1 wherein said logic stage includes two inputs and first, second, third and fourth transistors, said logic stage first transistor having an emitter electrode connected to a first logic input, a base electrode connected to a further potential source and a collector electrode connected to the base electrode of said logic stage second transistor, said logic stage third transistor having its emitter electrode connected to the other logic input, its base electrode connected to said further potential source, and its collector electrode connected to the base electrode of said logic stage fourth transistor, said logic stage second and fourth transistor collector electrodes respectively connected to said source of potential, and each of the emitter electrodes of said logic stage second and fourth transistors respectively connected to the base electrode of a fifth transistor, said logic stage fifth transistor having its emitter electrode connected to a source of reference potential, and its collector electrode connected to the base electrode of said third transistor of said three-transistor stage.

* * * * *

PO-1050
(5/69)

UNITED STATES PATENT OFFICE
CERTIFICATE OF CORRECTION

Patent No. 3,648,060 Dated March 7, 1972

Inventor(s) THOMAS E. HAGEN

It is certified that error appears in the above-identified patent and that said Letters Patent are hereby corrected as shown below:

Col. 2, line 16, before "2" insert --Q--;

line 36, "output" should be --input--;

line 38, after "D4" insert --, D5,--

IN THE CLAIMS

Claim 2, line 2, after "diodes" delete ".".

Signed and sealed this 29th day of August 1972.

(SEAL)
Attest:

EDWARD M.FLETCHER,JR.
Attesting Officer

ROBERT GOTTSCHALK
Commissioner of Patents